United States Patent [19]
Haisma et al.

[11] Patent Number: 5,637,028
[45] Date of Patent: Jun. 10, 1997

[54] METHOD OF POLISHING A SURFACE OF A NOBLE METAL

[75] Inventors: Jan Haisma; Cornelis L. Adema; Lambertus Postma; Mathijs P. H. Souts, all of Eindhoven, Netherlands

[73] Assignee: U.S. Philips Corporation, New York, N.Y.

[21] Appl. No.: 213,776

[22] Filed: Mar. 16, 1994

[30] Foreign Application Priority Data

Jul. 12, 1993 [BE] Belgium .................. 09300715

[51] Int. Cl.$^6$ .................................................. B24B 1/00
[52] U.S. Cl. .................................. 451/36; 451/28
[58] Field of Search ........................ 451/36, 28; 29/603

[56] References Cited

U.S. PATENT DOCUMENTS

| | | | |
|---|---|---|---|
| 3,955,213 | 5/1976 | Brower et al. | 451/28 |
| 4,358,295 | 11/1982 | Namba et al. | 51/309 |
| 4,475,981 | 10/1984 | Rea | 451/36 |
| 5,133,159 | 7/1992 | Nelson | 451/36 |
| 5,136,818 | 8/1992 | Bramson | 451/36 |
| 5,182,881 | 2/1993 | Cox et al. | 451/36 |

*Primary Examiner*—Robert A. Rose
*Attorney, Agent, or Firm*—John C. Fox

[57] ABSTRACT

Method of polishing a surface (5a) of a noble metal or an alloy comprising mainly noble metal, in which a polishing means is moved across the surface while exerting a polishing pressure for obtaining a plane and smooth polished surface without any defects. A composition comprising demineralized water with 20 to 40% by weight of an organic liquid comprising a poly-alcohol or a derivative thereof, for example, glycerol, and particles which can be encapsulated and have a Knoop's hardness of between 5 and 50 GPa, for example $Al_2O_3$ grains, is used as a polishing means.

25 Claims, 2 Drawing Sheets

METHOD OF POLISHING A SURFACE OF A NOBLE METAL

BACKGROUND OF THE INVENTION

The invention relates to a method of polishing a surface of a noble metal or an alloy comprising mainly noble metal, in which a polishing means and said surface are moved with respect to each other while exerting a polishing pressure for obtaining a polished surface.

It is generally known to polish platinum, gold or silver surfaces mechanically by means of polishing grains. Although a satisfactory planeness can generally be achieved in this way, the polished surface has many grooves and scratches when viewed microscopically. Moreover, mechanical polishing causes material disturbances under the polished surface. A mechanically polished surface is unsuitable for many uses such as, for example direct bonding. Moreover, in the manufacture of layered high-tech products, such as thin-film magnetic heads, very plane and smooth polished surfaces without defects are required.

OBJECTS AND SUMMARY OF THE INVENTION

It is an object of the invention to provide a method of polishing a surface of a noble metal or an alloy comprising mainly noble metal, in which a polishing means is moved across the surface to be polished while exerting a polishing pressure, with which method a surface which is substantially plane, smooth and without defects can be obtained.

To this end the method according to the invention is characterized in that a composition comprising demineralised water with 20 to 40% by weight of an organic liquid comprising a poly-alcohol or a derivative thereof and particles which can be encapsulated and have a Knoop's hardness of between 5 and 50 GPa is used as a polishing means.

It has been found that use of the method according to the invention for noble metals such as Pt, Au or Ag or mixed forms thereof, or alloys comprising mainly noble metals such as silver-magnesium, gold-aluminium, platinum-tin, including possible intermetallic compounds such as $Ag_3Mg$, $Au_3Al_2$, $Pt_3Sn$, which can be characterized as being relatively soft, yields substantially plane polished surfaces without defects, in which surface roughnesses R (rms) of less than 2 nm can be achieved. It is assumed that the organic liquid present in the indicated amount in the polishing means functions as an encapsulating, suspending means for the particles which are present, so that the possibility of scratches is minimal in spite of the hardness of the small particles.

It is to be noted that it is known to polish diamond without defects by means of a polishing means comprising $SiO_2$ nanoparticles and sub-micron particles of diamond in an alkaline solution. This method of polishing without defects is, however, unsuitable for polishing a relatively soft surface of a noble metal or an alloy comprising mainly noble metal, because noble metals are not chemically susceptible to an alkaline environment. Moreover, polishing particles of diamond are much too hard in proportion to the hardness of noble metals or soft alloys thereof.

An embodiment of the method according to the invention is characterized in that grains having a groin size of the order of 50 nm are used as particles. These groins are slightly larger than microclusters. It has been found that the particles can be encapsulated and suspended satisfactorily at said grain size so that, while maintaining the hardness, the possibility of scratches is minimal.

An embodiment of the method according to the invention is characterized in that $Al_2O_3$ grains are used as particles. It has been found that these particles having a Knoop's hardness of approximately 21 GPa not only have a suitable hardness but can also be eminently encapsulated and suspended in the previously mentioned organic liquid. $SnO_2$ grains having a Knoop's hardness of approximately 6.5 GPa may also be used successfully.

Colloidal-chemical circumstances, such as the electrophoretic potential of the particles used in the organic liquid determine their suitability for use in the method according to the invention. It has been found that $Al_2O_3$ and $SnO_2$ particles are eminently suitable in an organic liquid comprising glycerol or consisting of glycerol. Another suitable liquid comprises a stearic acid ester of glycerol, suspended in water. It is to be noted that grains of cerium oxide, which are suitable as regards hardness, are not satisfactory.

It is to be noted that the use of glycerol in a polishing means is known per se from U.S. Pat. No. 4,358,295 (herewith incorporated by reference). U.S. Pat. No. 4,358,295 describes a polishing method which is used as a finishing operation of a surface of relatively hard magnetic materials, particularly ferrite or an FeAlSi alloy, using a metal polishing disc. The liquid polishing means used comprises 10 to 30% by weight of glycerol and 1 to 4% by weight of polishing grains of magnesium oxide having a grain size of approximately 0.1 µm. The polishing pressure is in the range between 0.2 and 0.3 kg/cm². It has been found that this known polishing method is unsuitable for achieving very small surface roughnesses on surfaces of noble metals or noble metal alloys which are much softer as compared with ferrite. The use of $Al_2O_3$ particles as a polishing means is discouraged in U.S. Pat. No. 4,358,295.

An embodiment of the method according to the invention is characterized in that 0.1 to 1% by weight of particles is used. Coagulation is prevented at this relatively low percentage of particles.

An embodiment of the method according to the invention is characterized in that a maximum polishing pressure of 150 g/cm² is used. In the method according to the invention physical, chemical and mechanical parameters play a role. The polishing pressure is an external magnitude with which the method can be controlled and optimized. Said relatively low polishing pressure yields an optimal result because the particles are prevented from being pressed through the encapsulating layer during polishing at this pressure.

An embodiment of the method according to the invention is characterized in that an auxiliary polishing means absorbing the polishing means is used. This auxiliary polishing means, which is also referred to as polishing base, retains the polishing means during polishing and thereby ensures, inter alia an optimum wetting of the surface to be polished. A tissue of organic fibres or a polishing cloth of pressed organic fibres is preferably used. The hardness of the polishing base is extremely important for optimization of the method according to the invention. The auxiliary polishing means preferably has a Shore A hardness of between 10 and 80; DIN: 53505.

An embodiment of the method according to the invention is characterized in that the method starts from a substrate on which a layer having a surface of a noble metal or an alloy comprising mainly noble metal is formed. This embodiment, in which the electrically conducting layer may be structured, is particularly suitable for use in the manufacture of planar thin-film magnetic heads in which strict requirements as regards smoothness, planeness and condition, particularly physical condition of polished surfaces are imposed. In thin-film magnetic heads a structured layer formed as a write and/or test winding generally occurs. Notably in the ease of a write winding, the layer should have a low resistance, for example less than 1 Ohm. The method according to the invention provides the possibility of using narrow, relatively thick windings, in which the layer is embedded in the substrate. A hard ferrite can be used without any problem as a substrate material.

An embodiment of the method according to the invention is characterized in that a non-magnetic layer is deposited on the polished surface obtained for forming a transducing gap of a magnetic head. Due to the accurate polished surface which is present, the non-magnetic layer may be perfectly smooth without any thickness variations when using the method according to the invention and may thus have an accurately defined thickness. The thickness of the non-magnetic layer determines the writing behaviour of the magnetic head obtained. For example, quartz or zirconia may be used as a material for the non-magnetic layer, which material may be deposited by PE-CVD or sputtering, respectively.

The invention also relates to a magnetic head obtainable by means of the method according to the invention. The thin-film magnetic head obtained may be a read and/or write head. In the case of a read head a high efficiency is required. To this end a recess or a groove can be provided in the magnetic yoke of the magnetic head when using the method according to the invention. A noble metal or an alloy comprising mainly noble metal is deposited in the recess, whereafter a planarization process is carried out, using the method according to the invention for obtaining a polished surface.

The invention also relates to a polishing means which is suitable for use in the method according to the invention.

The polishing means according to the invention is characterized by the presence of demineralised water with 20 to 40% by weight of an organic liquid comprising a poly-alcohol or a derivative thereof and particles which can be encapsulated and have a Knoop's hardness of between 5 and 50 GPa. The composition of the polishing means according to the invention is based on the recognition that particles within said range of hardnesses which can be taken up for electrophoretic potential reasons in a suitable organic solution and can be encapsulated and suspended without flocculation are suitable for realising a very smooth, defectless polished surface of a noble metal or an alloy comprising mainly noble metal.

An embodiment of the polishing means according to the invention is characterized in that the particles comprise grains having a grain size of the order of 50 nm. At this size the intrinsic hardness properties of the material become sufficiently manifest, while the particles are sufficiently small to be fully encapsulated.

An embodiment of the polishing means according to the invention is characterized in that the particles comprise $Al_2O_3$ and/or $SnO_2$ grains. These grains are particularly suitable for suspension in the organic liquid comprising a poly-alcohol or a derivative thereof.

An embodiment of the polishing means according to the invention is characterized in that 0.1 to 1% by weight of particles is present. The proportionally small quantity of particles prevents coagulation of particles to larger clusters and ensures a scratchless polishing means.

An embodiment of the polishing means according to the invention is characterized by the presence of glycerol. Glycerol has been found eminently suitable, particularly in combination with $Al_2O_3$ and/or $SnO_2$. Another suitable poly-alcohol is glycol or a polyvinyl alcohol.

These and other aspects of the invention will be apparent from and elucidated with reference to the embodiments described hereinafter.

In the drawings

FIGS. 1 to 8 illustrate stages in a method of manufacturing a planar magnetic head, according to an embodiment of the invention, and FIG. 9 shows a thin-film magnetic head made by said method.

DESCRIPTION OF THE PREFERRED EMBODIMENTS

Figure 1:
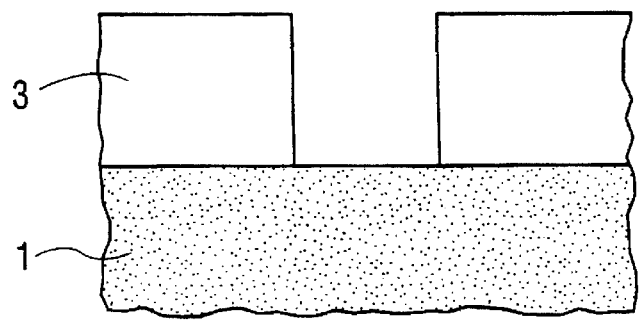
Figure 2:
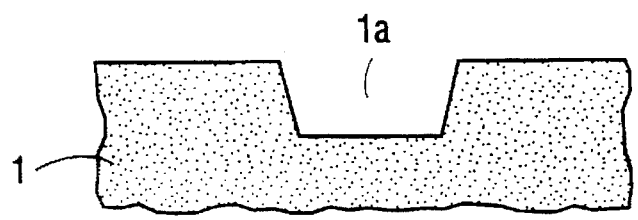
Figure 3:
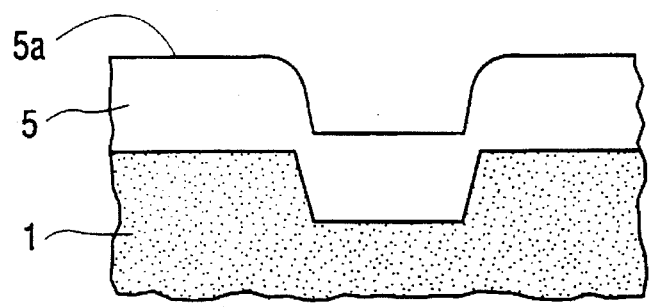
Figure 4:
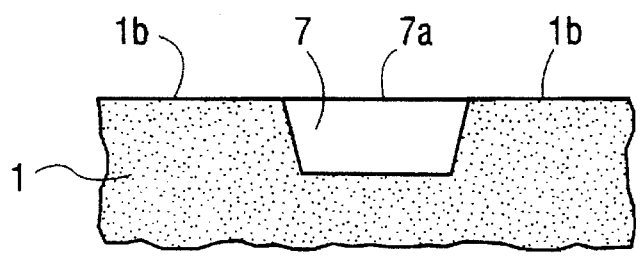
Figure 5:
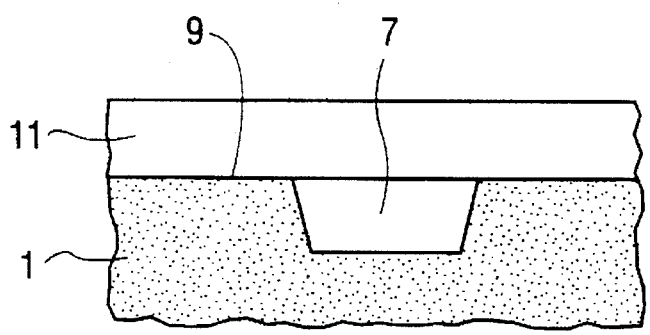
Figure 6:
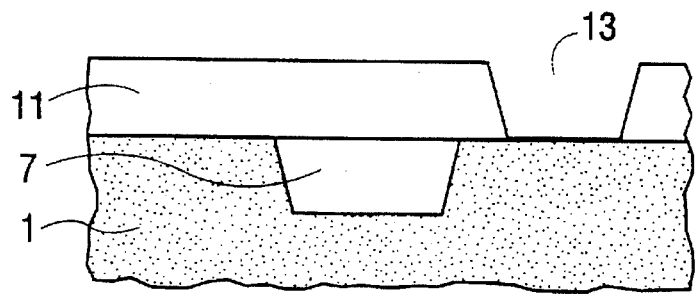
Figure 7:
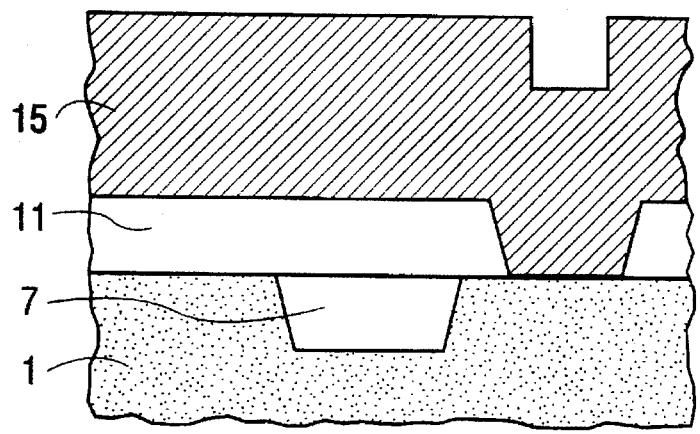
Figure 8:
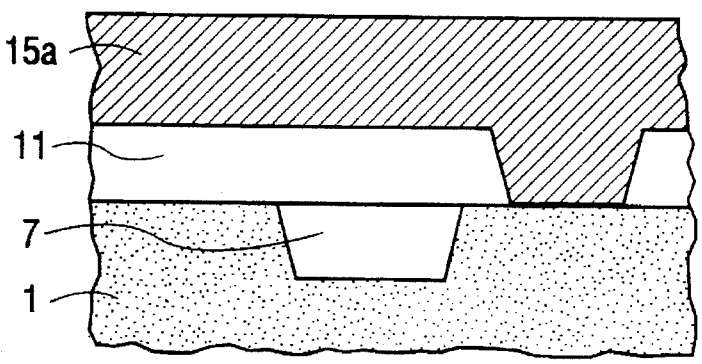

A method of manufacturing a thin-film magnetic head, using an embodiment of the method according to the invention will be described with reference to FIGS. 1 to 8. The method starts from a soft-magnetic substrate 1, in this embodiment a ferrite such as NiZn ferrite having a smooth and plane substrate surface on which a mask 3, in this embodiment a mask of nickel is formed by successive deposition and structuring. The deposition of a nickel layer may be performed by means of an electroplating process, while a photoresist layer may be used for structuring. A groove or recess 1a is formed in the substrate 1 by removal of material, for example by sputter-etching or reactive ion etching, whereafter any remaining parts of the mask 3 are removed by, for example wet-chemical etching. A layer 5 of a noble metal, in this embodiment gold, is provided, for example, by means of sputtering on the substrate 1 thus structured. To improve the adhesion of the noble metal to the ferrite material, a layer of an adhesive material, in this embodiment Mo, may be formed before the noble metal is provided.

The layer 5 has a noble metal surface 5a remote from the substrate 1, which surface is polished by means of the method according to the invention for obtaining a winding 7 serving as an inductive transducing element and having an at least substantially plane surface 7a without scratches and defects. To this end an embodiment of the polishing means according to the invention is used, which means has a composition comprising demineralised water with 20 to 40% by weight of glycerol and 0.1 to 1% by weight of $Al_2O_3$ grains having an average diameter of approximately 50 nm. The polishing means is moved with respect to the surface 5a by means of a polishing base of organic fibres, while simultaneously exerting a polishing pressure of approximately 100 g/cm². During polishing, the grains which are present are encapsulated in glycerol, in which the relatively low polishing pressure used prevents grains from being pressed through organic layers surrounding the grains. It has surprisingly been found that the polished noble metal surface 7a obtained perfectly adjoins the adjacent surface portions 1b of the substrate 1. It is to be noted that planenesses of less than 100 nm are readily achievable.

The surfaces 1b and 7a jointly form a smooth main surface 9 on which a layer 11 of a non-magnetic, electrically non-conducting material is formed. To this end, for example quartz or zirconia can be deposited by means of PE-CVD or sputtering, respectively. In this respect it is important that the layer 11 has an accurate uniform layer thickness because a portion of the layer 11 in the manufactured magnetic head functions as a transducing gap 11a (see FIG. 9). By using a recessed conductor, the thickness of layer 11 can also be chosen freely for a small write gap. In the case of a non-recessed conductor, thick insulation layers must be provided so as to ensure a satisfactory step coating and to prevent short-circuits between the conductor and the magnetic yoke, which thick insulation layers must be re-etched at a later stage to the correct thickness so as to realise the desired write gap.

In the layer 11 formed a connection aperture 13 is provided by means of a known technique, for example by chemical etching in quartz. Subsequently a soft-magnetic material, for example an NiFe alloy or a CoZrNb alloy is deposited by means of a known deposition technique for forming a flux-guiding layer 15. Subsequently the layer 15 is polished for forming a flux guide 15a and a head face 17 can be formed by means of grinding and/or polishing.

Figure 9:
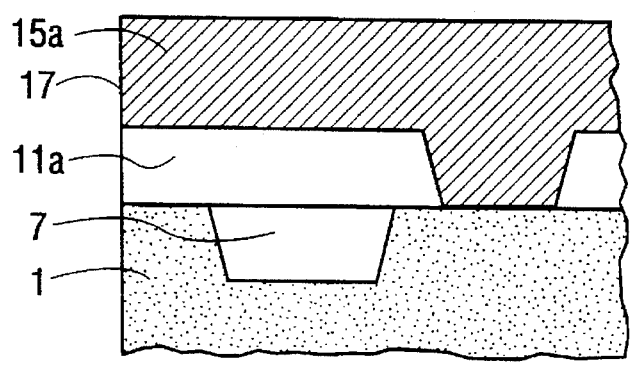

FIG. 9 shows a thin-film magnetic head obtained by means of the method described above. This magnetic head comprises an inductive element 7 which is recessed in the substrate 1 and is provided with a magnetic yoke formed by the substrate 1 and the flux guide 15a and a non-magnetic transducing gap 11a.

It is to be noted that particles which can be encapsulated and have a Knoop's hardness of between 5 and 10 GPa can be used instead of $Al_2O_3$ grains in the polishing means.

It is further to be noted that instead of Au, another noble metal or an alloy comprising mainly noble metal such as platinum-tin, gold-nickel or silver-copper can be polished.

For polishing a platinum surface an embodiment of the method according to the invention was used in a successful experiment in which the polishing means comprised 400 cc of demineralised water, 150 cc of glycerol and 5 g of $Al_2O_3$ grains having an average grain size of 50 nm. The polishing pressure was between 25 and 50 $g/cm^2$.

In another experiment, in which a perfectly polished silver surface was obtained, a composition of 500 cc of demineralised water, 100 cc of glycerol and 2 g of $Al_2O_3$ particles having an average grain size of 50 nm was used as a polishing means. The polishing pressure was 100 $g/cm^2$.

It is further to be noted that the method according to the invention is not limited to its use in processes of manufacturing magnetic heads, but is suitable for many applications in which strict requirements are imposed on the surface condition of noble metals or soft alloys thereof.

We claim:

1. A method of polishing a surface of a noble metal or an alloy comprising mainly noble metal, comprising the steps of moving a polishing means and said surface with respect to each other while exerting a polishing pressure on the surface with the polishing means for obtaining a polished surface, characterized in that the polishing means comprises a composition comprising demineralized water with 20 to 40% by weight of an organic liquid comprising a poly-alcohol or a derivative thereof and particles having a Knoop's hardness of between 5 and 50 GPa.

2. A method as claimed in claim 1, characterized in that the particles have a grain size of the order of 50 nm.

3. A method as claimed in claim 1, characterized in that the particles comprise $Al_2O_3$.

4. A method as claimed in claim 1, characterized in that the particles comprise $SnO_2$.

5. A method as claimed in claim 1, characterized in that the particles are present in the composition in the amount of from 0.1 to 1% by weight.

6. A method as claimed in claim 1, characterized in that the poly-alcohol comprises glycerol.

7. A method as claimed in claim 1, characterized in that a maximum polishing pressure of 150 $g/cm^2$ is used.

8. A method as claimed in claim 1, characterized in that the polishing means comprises means for absorbing the composition.

9. A method as claimed in claim 8, characterized in that the absorbing means comprises a tissue of organic fibres.

10. A method as claimed in claim 1, characterized in that prior to polishing, a layer having a surface of the noble metal or alloy comprising mainly noble metal is formed on a substrate.

11. A method as claimed in claim 10, characterized in that subsequent to polishing a non-magnetic layer is deposited on the polished surface obtained, the non-magnetic layer forming a transducing gap of a magnetic head.

12. A method as claimed in claim 5, characterized in that the poly-alcohol comprises glycerol.

13. A polishing composition suitable for use in the method as claimed in claim 1, characterized by the presence of demineralised water with 20 to 40% by weight of an organic liquid comprising a poly-alcohol or a derivative thereof and particles having a Knoop's hardness of between 5 and 50 GPa.

14. A polishing composition as claimed in claim 13, characterized in that the particles have a grain size of the order of 50 nm.

15. A polishing composition as claimed in claim 13, characterized in that the particles comprise one or more of the members selected from the group consisting of $Al_2O_3$ and $SnO_2$.

16. A polishing composition as claimed in claim 13, characterized in that the particles are present in the amount of from 0.1 to 1% by weight.

17. A polishing means as claimed in claim 13, characterized in that the poly-alcohol comprises glycerol.

18. A method as claimed in claim 2, characterized in that the particles comprise $Al_2O_3$.

19. A method as claimed in claim 2, characterized in that the particles comprise $SnO_2$.

20. A method as claimed in claim 2, characterized in that the particles are present in the composition in the amount of from 0.1 to 1% by weight.

21. A method as claimed in claim 3, characterized in that the particles are present in the composition in the amount of from 0.1 to 1% by weight.

22. A method as claimed in claim 4, characterized in that the particles are present in the composition in the amount of from 0.1 to 1% by weight.

23. A method as claimed in claim 2, characterized in that the poly-alcohol comprises glycerol.

24. A method as claimed in claim 3, characterized in that the poly-alcohol comprises glycerol.

25. A method as claimed in claim 4, characterized in that the poly-alcohol comprises glycerol.

* * * * *